United States Patent
He et al.

(10) Patent No.: US 9,453,498 B2
(45) Date of Patent: Sep. 27, 2016

(54) METHOD FOR BACKING UP AND RECOVERING BLADE ZERO POINT OF PITCH DRIVE SYSTEM FOR WIND TURBINE AND PITCH DRIVE SYSTEM FOR WIND TURBINE

(71) Applicant: DELTA ELECTRONICS, INC., Taoyuan Hsien (TW)

(72) Inventors: Yu-Ding He, Taoyuan Hsien (TW); Jian Wang, Taoyuan Hsien (TW); Hong-Yan Liu, Taoyuan Hsien (TW); Zhi-Guang Gao, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 661 days.

(21) Appl. No.: 13/843,802

(22) Filed: Mar. 15, 2013

(65) Prior Publication Data

US 2014/0064961 A1    Mar. 6, 2014

(30) Foreign Application Priority Data

Sep. 6, 2012    (CN) ............ 2012 1 0328135

(51) Int. Cl.
 *F03D 7/02* (2006.01)
(52) U.S. Cl.
 CPC ............ *F03D 7/0224* (2013.01); *Y02E 10/723* (2013.01)
(58) Field of Classification Search
 CPC .... F04D 29/362; F04D 29/36; F03D 7/0224; Y02E 10/723
 See application file for complete search history.

(56) References Cited

U.S. PATENT DOCUMENTS

| | | | | |
|---|---|---|---|---|
| 7,988,414 B2* | 8/2011 | Benito | ........... | F03D 7/0224 416/33 |
| 8,231,344 B2* | 7/2012 | Kinzie | ........... | F03D 1/0608 416/1 |
| 8,249,852 B2* | 8/2012 | Thulke | ........... | F03D 7/045 290/44 |
| 8,303,249 B2* | 11/2012 | Haans | ........... | F03D 7/022 416/1 |
| 8,511,988 B2* | 8/2013 | Birkemose | ........... | F03D 7/0296 416/1 |
| 8,523,520 B2* | 9/2013 | Nagasaki | ........... | F03D 7/0224 416/1 |
| 8,649,911 B2* | 2/2014 | Avagliano | ........... | F03D 7/028 290/44 |
| 8,866,434 B2* | 10/2014 | Jones | ........... | F03D 7/0224 290/44 |
| 2010/0133815 A1 | 6/2010 | Middendorf et al. | | |
| 2010/0133825 A1 | 6/2010 | Gao | | |
| 2011/0142630 A1* | 6/2011 | Hayashi | ........... | F03D 7/0224 416/34 |
| 2011/0223017 A1 | 9/2011 | Smith | | |
| 2012/0193917 A1* | 8/2012 | Chen | ........... | F03D 7/0224 290/44 |

(Continued)

FOREIGN PATENT DOCUMENTS

| CN | 102011696 | 4/2011 |
|---|---|---|
| CN | 202165215 | 3/2012 |

(Continued)

*Primary Examiner* — Bryan Lettman
(74) *Attorney, Agent, or Firm* — Hauptman Ham, LLP

(57) ABSTRACT

A pitch drive system for a wind turbine includes a pitch drive motor, a first position detector, a driver, a second position detector, and a controller. When the blades rotate to a mechanical zero position, a position value detected by the first position detector is a first zero point position value. The driver is operable to store the first zero point position value. When the blades rotate to the mechanical zero position, a position value detected by the second position detector is a second zero point position value. The controller is operable to store the second zero point position value. When a corresponding back up command is received, the first zero point position value stored in the driver is backed up into the controller, and the second zero point position value stored in the controller is backed up into the driver respectively.

9 Claims, 4 Drawing Sheets

(56) References Cited

U.S. PATENT DOCUMENTS

| | | | |
|---|---|---|---|
| 2013/0216380 A1* | 8/2013 | Liu | F03D 7/0224 416/23 |
| 2013/0230400 A1* | 9/2013 | Gao | F03D 7/0224 416/1 |
| 2013/0270829 A1* | 10/2013 | Miyamoto | F03D 7/0224 290/51 |
| 2013/0287568 A1* | 10/2013 | Miranda | F03D 7/0224 416/1 |
| 2014/0017079 A1* | 1/2014 | Grabau | F03D 7/0224 416/1 |
| 2015/0078895 A1* | 3/2015 | Odgaard | F03D 7/0224 416/1 |

FOREIGN PATENT DOCUMENTS

| | | |
|---|---|---|
| CN | 102588212 | 7/2012 |
| TW | 201126064 | 8/2011 |
| WO | 2012061953 | 5/2012 |

\* cited by examiner

METHOD FOR BACKING UP AND RECOVERING BLADE ZERO POINT OF PITCH DRIVE SYSTEM FOR WIND TURBINE AND PITCH DRIVE SYSTEM FOR WIND TURBINE

RELATED APPLICATIONS

This application claims priority to China Application Serial Number 201210328135.1, filed Sep. 6, 2012, which is herein incorporated by reference.

BACKGROUND

1. Field of Invention

The embodiment of the present invention relates generally to a pitch drive system for wind turbine and, more particularly, to a method for backing up and recovering blade zero point of pitch drive system for wind turbine and a pitch drive system for wind turbine.

2. Description of Related Art

In recent years, green energy industry is booming because of the global climate change and shortage of resource and energy. Wind power generation, with limitless resources same as the solar energy, is an essential aspect of the green energy industry. Therefore, there have been plenty of researches and developments regarding the wind power generation in the United States since late 19th century.

Concerning the maintenance of a wind turbine, when a component in a pitch drive system for a wind turbine is required to be changed, a maintenance worker needs to enter a hub of a wind power generator to reset a zero position of a blade such that the pitch drive motor of the wind power generator can operate normally. Specifically, when the zero position of the blade is reset, the maintenance worker needs to rotate the blade to a mechanical zero position by virtue of a manual operation box, and the zero position of the blade can be recorded.

However, the above-mentioned maintenance requires the operation under the specialist and cooperation between many people, and the operation is time consuming due to its complicity. Many efforts have been devoted trying to find a solution of the aforementioned problems. Nonetheless, there still a need to improve the existing apparatus and techniques in the art.

SUMMARY

A pitch drive system for a wind turbine and a method for backing up and recovering a blade zero point of the pitch drive system for the wind turbine are provided, which addresses the problem of changing elements in the pitch drive system for the wind turbine being merely executed by many professionals such that it is not only complex, but also time consuming.

One aspect of the embodiment of the present invention is to provide a pitch drive system for a wind turbine. The pitch drive system for a wind turbine comprises a pitch drive motor, a first position detector, a driver, a second position detector, and a controller. With respect to the structure, the first position detector is disposed at a pivot terminal of the pitch drive motor, the driver is electrically connected to the pitch drive motor, the second position detector is disposed at an end of the blade, and the controller is electrically connected to the second position detector.

With respect to the operation, the pitch drive motor is operable to drive a blade through a transmission mechanism. When the blade rotates to a mechanical zero position, a position value detected by the first position detector is a first zero point positional value. The driver is operable to store the first zero point positional value. When the blade rotates to the mechanical zero position, a position value detected by the second position detector is a second zero point positional value. The controller is operable to store the second zero point positional value. When a corresponding back-up command is received, the first zero point positional value stored in the driver is backed up to the controller, and the second zero point positional value stored in the controller is backed up to the driver.

In one embodiment of the present invention, when the driver is changed into another driver, the first zero point positional value which is backed up in the controller is transferred to the another driver.

In another embodiment of the present invention, when the controller is changed into another controller, the second zero point positional value which is backed up in the driver is transferred to the another controller.

In yet another embodiment of the present invention, when the first position detector is changed into another first position detector, the controller calculates a second blade angle according to the second zero point position and transfers the second blade angle to the driver, wherein the driver calculates the first zero point positional value according to the position value detected by the another first position detector and the second blade angle.

In still another embodiment of the present invention, the second blade angle is calculated by the controller according to the following formula:

$$\theta_B = K_B * (X_B - X_{B0}),$$

where $\theta_B$ is the second blade angle, $K_B$ is a transmission coefficient from the blade to the second position detector, $X_B$ is a position value the second position detector reads, and $X_{B0}$ is the second zero point positional value.

In yet another embodiment of the present invention, the first zero point position calculated by the driver according to the following formula:

$$X_{A0} = X_A - \frac{\theta_B}{K_A},$$

where $X_{A0}$ is the first zero point positional value, $X_A$ is a position value the another first position detector reads, $\theta_B$ is the second blade angle, and $K_A$ is a transmission coefficient from the blade to the another first position detector.

In still another embodiment of the present invention, when the second position detector is changed into another second position detector, the driver calculates a first blade angle according to the first zero point position and transfers the first blade angle to the controller, wherein the controller calculates the second zero point positional value according to the position value detected by the another second position detector and the first blade angle.

In yet another embodiment of the present invention, the first blade angle is calculated by the controller according to the following formula:

$$\theta_A = K_A * (X_A - X_{A0}),$$

where $\theta_A$ is the first blade angle, $K_A$ is a transmission coefficient form the blade to the first position detector, $X_A$ is a position value the first position detector reads, and $X_{A0}$ is the first zero point positional value.

In still another embodiment of the present invention, the second zero point position is calculated by the controller according to the following formula:

$$X_{B0} = X_B - \frac{\theta_A}{K_B},$$

where $X_{B0}$ is the second zero point positional value, $X_B$ is a position value the another second position detector reads, $\theta_A$ is the first blade angle, and $K_B$ is a transmission coefficient from the blade to the another second position detector.

In another aspect of the embodiment of the present invention, a method for backing up and recovering blade zero point of a pitch drive system for a wind turbine is provided. The method comprises the steps of: when a blade rotates to a mechanical zero position, receiving a first zero point positional value by a first position detector; the first zero point positional value being stored by a driver; when the blade rotates to the mechanical zero position, receiving a second zero point positional value by a second position detector; the second zero point positional value is stored by a controller; when a corresponding back-up command is received, the first zero point positional value stored in the driver being backed up to the controller; and when the corresponding back-up command is received, the second zero point positional value stored in the controller is backed up to the driver.

In one embodiment of the present invention, when the driver is changed into another driver, the first zero point positional value which is backed up in the controller is transferred to the another driver.

In another embodiment of the present invention, when the controller is changed into another controller, the second zero point positional value which is backed up in the driver is transferred to the another controller.

In yet another embodiment of the present invention, when the first position detector is changed into another first position detector, a second blade angle is calculated by the controller according to the second zero point position, and the second blade angle is transferred to the driver, wherein the first zero point positional value is calculated by the driver according to a position value detected by the another first position detector and the second blade angle.

In still another embodiment of the present invention, the second blade angle is calculated by the controller according to the following formula:

$$\theta_B = K_B^*(X_B - X_{B0}),$$

where $\theta_B$ is the second blade angle, $K_B$ is a transmission coefficient from the blade to the second position detector, $X_B$ is a position value the second position detector reads, and $X_{B0}$ is the second zero point positional value.

In yet another embodiment of the present invention, the first zero point position is calculated by the driver according to the following formula:

$$X_{A0} = X_A - \frac{\theta_B}{K_A},$$

where $X_{A0}$ is the first zero point positional value, $X_A$ is a position value the another first position detector reads, $\theta_B$ is the second blade angle, and $K_A$ is a transmission coefficient from the blade to the another first position detector.

In still another embodiment of the present invention, when the second position detector is changed into another second position detector, a first blade angle is calculated by the driver according to the first zero point position, and the first blade angle is transferred to the controller, wherein the second zero point positional value is calculated by the controller according to a position value detected by the another second position detector and the first blade angle.

In yet another embodiment of the present invention, the first blade angle is calculated by the controller according to the following formula:

$$\theta_A = K_A^*(X_A - X_{A0}),$$

where $\theta_A$ is the first blade angle, $K_A$ is a transmission coefficient from the blade to the first position detector, $X_A$ is a position value the first position detector reads, and $X_{A0}$ is the first zero point positional value.

In still another embodiment of the present invention, the second zero point position is calculated by the controller according to the following formula:

$$X_{B0} = X_B - \frac{\theta_A}{K_B},$$

where $X_{B0}$ is the second zero point positional value, $X_B$ is a position value the another second position detector reads, $\theta_A$ is the first blade angle, and $K_B$ is a transmission coefficient from the blade to the another second position detector.

As a result, the embodiments of the present invention provide a pitch drive system for a wind turbine and a method for backing up and recovering a blade zero point of the pitch drive system for the wind turbine, which address the problem of changing elements in the pitch drive system for the wind turbine being merely executed by many professionals such that it is not only complex, but also time consuming.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
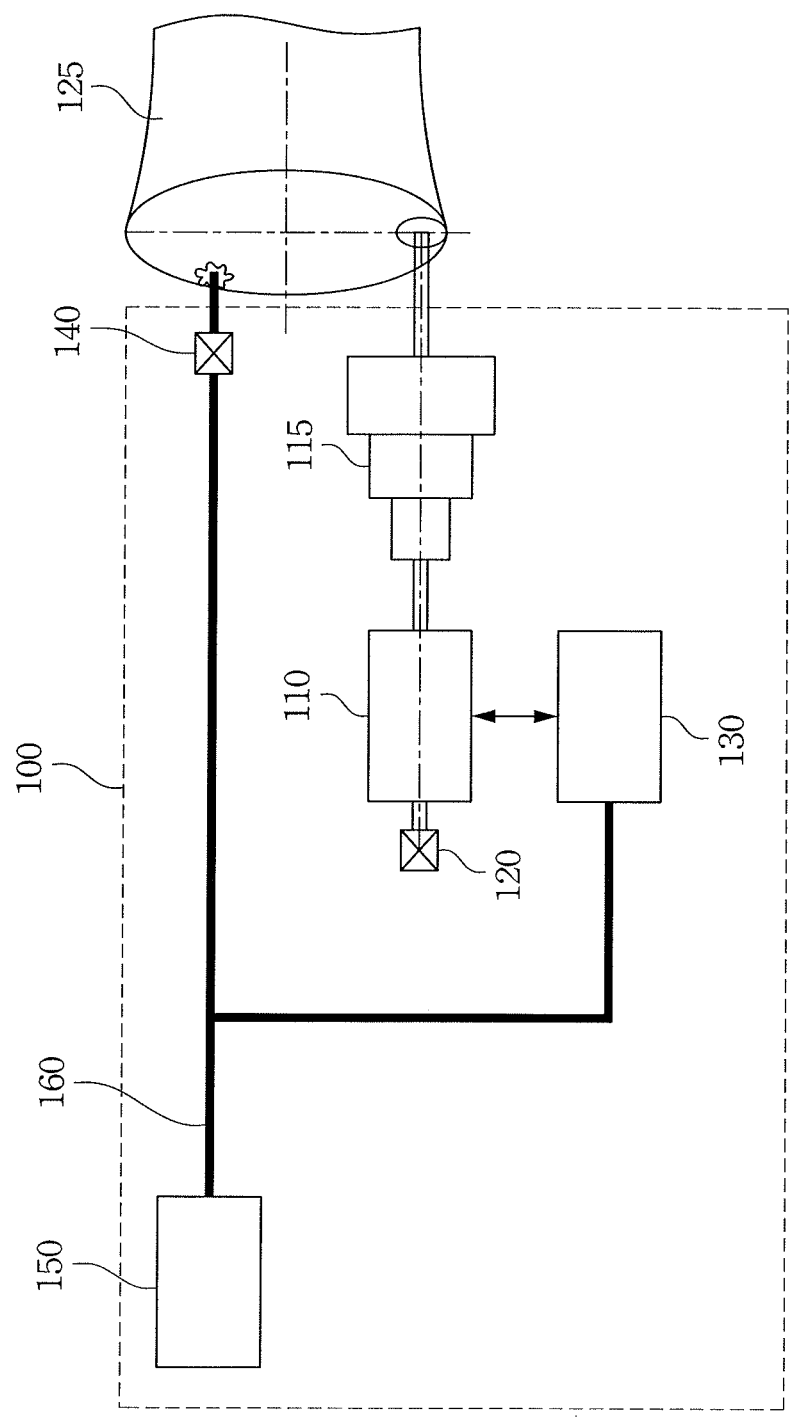
FIG. 1 schematically shows a circuit block diagram of a pitch drive system for a wind turbine according to embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 schematically shows a circuit block diagram of a pitch drive system for a wind turbine according to embodiments of the present invention. As shown in the figure, the pitch drive system for the wind turbine 100 comprises a pitch drive motor 110, a first position detector 120, a driver 130, a second position detector 140, and a controller 150. When implementing the embodiment of the present invention, the pitch drive system for the wind turbine 100 can be disposed at a rotor hub of the pitch drive system for the wind turbine 100, and the pitch drive system for the wind turbine 100 can be communicatively connected to the main control engine room (not shown) through the communication bus 160. With respect to the structure, the first position detector 120 is disposed at a pivot terminal of the pitch drive motor 110, the driver 130 is electrically connected to the pitch drive motor 110, the second position detector 140 is disposed at an end of the blade 125 (for example, connecting to an internal gear at the end of the blade 125), the controller 150 is electrically connected to the second position detector 140 and the driver 130 through the communication bus 160.

When implementing the embodiment of the present invention, the first position detector 120 and the second position detector 140 can be encoders, the driver 130 can be a pitch driver, and the controller 150 can be a programmable logic controller (PLC).

In addition, the pitch drive system for a wind turbine 100 can further comprise a transmission mechanism 115 (for example: gear box), and the pitch drive motor 110 can be connected to the blade 125 through the transmission mechanism 115.

With respect to the operation, the pitch drive motor 110 drives the blade 125 through the transmission mechanism 115. When the blade 125 rotates to the mechanical zero position, the position value the first position detector 120 reads is a first zero point positional value. The driver 130 is operable to store the first zero point positional value. When the blade 125 rotates to the mechanical zero position, the position value the second position detector 140 reads is a second zero point positional value. The controller 150 is operable to store the second zero point positional value.

In addition, when blade 125 already rotates to the mechanical zero position, the is pitch drive system for the wind turbine 100 can receive a back-up command transmitted from a main engine room such that the first zero point positional value which the driver 130 stores can be backed up to the controller 150 through the communication bus 160, and the second zero point positional value which the controller 150 stores can be backed up to the driver 130 through the communication bus 160.

As mentioned above, when the driver 130 is damaged and needed to be changed, the zero point position value can be transferred to a new driver through the communication bus 160 due to the zero point position value which the driver 130 needs being backed up to the controller 150 in advance such that the zero point position value which the new driver needs can be recovered. In addition, when the controller 150 is damaged and needed to be changed, the zero point position value can be transferred to a new controller through the communication bus 160 due to the zero point position value which the controller 150 needs being backed up to the driver 130 in advance such that the zero point position value which the new controller needs can be recovered.

Consequently, with the use of the pitch drive system for the wind turbine of the embodiment of the present invention, the zero position of the blade can be recovered directly when the elements of the pitch drive system is changed. The embodiment of the present invention provides the pitch drive system for the wind turbine which is simply to operate and is not time consuming. Furthermore, when the elements of the pitch drive system for the wind turbine of the embodiment of the present invention needs to be changed, it does not need many professionals to change the elements thereof so as to improve many problems when there being elements of the pitch drive system needed to be changed.

An embodiment of the present invention is used to illustrate the present invention exemplarily herein. With respect to manufacture, the position detector can be, but not limited to an encoder. The above-mentioned first position detector 120 can be an encoder A, and the above-mentioned second position detector 140 can be an encoder B in the embodiment of the present invention. The encoder A is operable to detect the position and the speed of the pitch drive motor 110 to generate corresponding information, and the corresponding information is fed back to the driver 130. The driver 130 controls the position and speed of the blade 125 with corresponding closed-loop control according to the fed-back position and speed information and the command information which the controller 150 receives.

In addition, the encoder B is operable to detect the position value of the blade 125, and the position value of the blade 125 is fed back to the controller 150. The controller 150 can receive the position and speed information detected by the encoder A from the driver 130, and compare the position value detected by the encoder A which is stored in to the driver 130 and the position value detect by the encoder B which is stored in the controller 150. If the deviation between the two is larger than a predetermined largest deviation value, an emergency feathering mechanism of the pitch drive system for the wind turbine 100 is activated.

Figure 2:
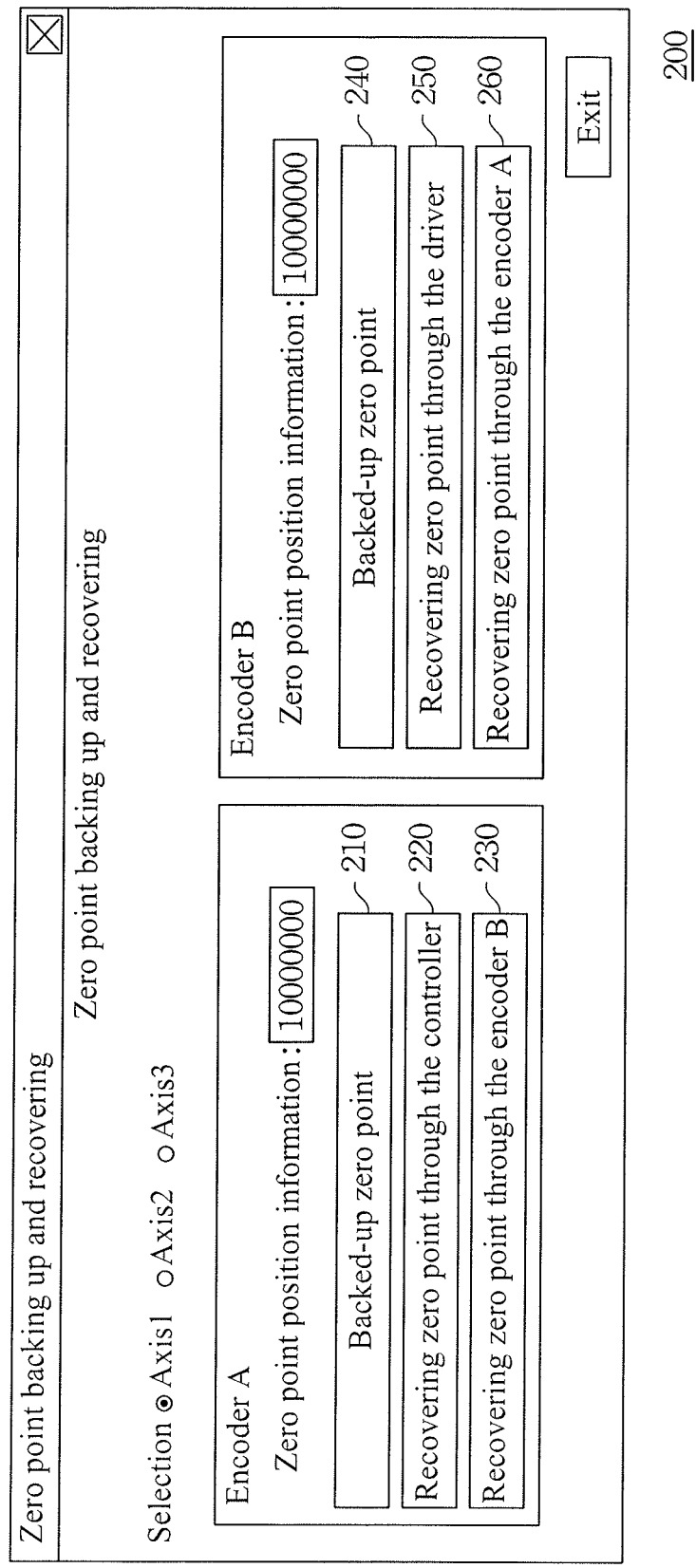
FIG. 2 schematically shows a diagram of an operating interface of upper computer software according to embodiments of the present invention.
Figure 3:
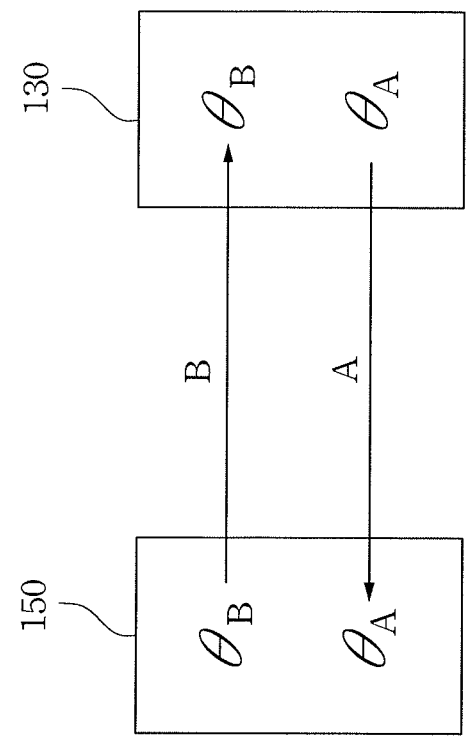
FIG. 3 schematically shows a diagram of a method for backing up a blade zero point according to embodiments of the present invention.

FIG. 2 schematically shows a diagram of an operating interface of upper is computer software according to embodiments of the present invention. FIG. 3 schematically shows a diagram of a method for backing up a blade zero point according to embodiments of the present invention. The following backed-up and recovering mechanism regarding the pitch drive system for the wind turbine 100 is referred to both FIG. 2 and FIG. 3.

First of all, after a blade zero position is set in an ordinary way, a computer with upper computer software is connected to a main control engine room such that a person in the main control engine room can control the pitch drive system for the wind turbine 100 through a communication bus. Subsequently, as shown in the figure, when a backed-up zero point button 210 corresponding to the encoder A is pressed, referring to FIG. 3, the computer with upper computer software executes a command corresponding to the backed-up zero point button 210. Moreover, as a path A shown in FIG. 3, the encoder A zero point position $X_{A0}$ which is stored in the driver 130 is backed up to the controller 150.

Furthermore, when a backed-up zero point button 240 corresponding to the encoder B is pressed, the computer with upper computer software executes a command to corresponding to the backed-up zero point button 240. Moreover, as a path B shown in FIG. 3, the encoder B zero point position $X_{B0}$ which is stored in the driver 130 is backed up to the controller 150.

When one of the driver 130 and the controller 150 is damaged and needed to be changed, the zero point position value can be recovered to a device which needs the zero point position value through the computer with upper computer software due to the zero point position value one of the driver 130 and the controller 150 needs being backed up to another in advanced.

The calculated way of the zero point position of the encoder A and B will be described herein in detailed so as to make the following backed-up and recovered manner of the zero point position of the encoder A and B easier to be understood, and the calculated way is shown below:

First, in the driver 130, the calculated formula of the real angle of the blade is in the form of:

$$\theta_A = K_A * (X_A - X_{A0}) \quad (1),$$

where $\theta_A$ is the blade angle calculated according to the position value of the encoder A, $K_A$ is the transmission coefficient from the blade to the encoder A, $X_A$ is the position value the encoder A reads, and $X_{A0}$ is the corresponding position value of the encoder A while the blade is at the mechanical zero.

In addition, in the controller 150, the calculated formula of the real angle of the blade is in the form of:

$$\theta_B = K_B * (X_B - X_{B0}) \quad (2),$$

where $\theta_B$ is the blade angle calculated according to the position value of the encoder B, $K_B$ is the transmission coefficient from the blade to the encoder B, $X_B$ is the position value the encoder B reads, and $X_{B0}$ is the corresponding position value of the encoder B while the blade is at the mechanical zero.

A condition is assumed as below to demonstrate the calculated way of the zero point position of the encoder A and B:

1. The transmission coefficient from the blade to the encoder A is assumed as 0.001, a line count of the encoder A is 5000 (that is, when the encoder A rotates 360°, the value $X_A$ is changed 5000), $K_A$ is in the form of $$K_A = \frac{0.001}{5000} * 360.$$

2. The transmission coefficient from the blade to the encoder B is 0.005, a line count of the encoder B is 5000 (that is, when the encoder B rotates 360°, the value $X_B$ is changed 5000), $K_B$ is in the form of:

$$K_B = \frac{0.005}{5000} * 360.$$

3. After the zero point of the blade is set for the first time and the zero point is backed up, $X_{A0} = \hat{X}_{A0} = 10000000$ $X_{B0} = \hat{X}_{B0} = 20000000$. The calculation ways of the blade in different angle are shown below:

I. When the blade is 0°,
$X_A = 10000000$ is substituted in formula (1), $\theta_A = K_A * (X_A - X_{A0})°$, $$\theta_A = K_A * (X_A - X_{A0}) = \frac{0.001}{5000} * 360 * (10000000 - 10000000) = 0°;$$

$X_B = 20000000$ is substituted in formula (2), $\theta_B = K_B * (X_B - X_{B0})$, $$\theta_B = \frac{0.005}{5000} * 360 * (20000000 - 20000000) = 0°;$$

II. When the blade is 45°,
$X_A = 10625000$ is substituted in formula (1), $\theta_A = K_A * (X_A - X_{A0})°$, $$\theta_A = \frac{0.001}{5000} * 360 * (10625000 - 10000000) = 45°;$$

$X_B = 20125000$ is substituted in formula (2), $\theta_B = K_B * (X_B - X_{B0})$, $$\theta_B = \frac{0.005}{5000} * 360 * (20125000 - 20000000) = 45°;$$

III. When the blade is 90°,
$X_A = 11250000$ is substituted in formula (1), $\theta_A = K_A * (X_A - X_{A0})°$, $$\theta_A = \frac{0.001}{5000} * 360 * (11250000 - 10000000) = 90°;$$

$X_B = 20250000$ is substituted in formula (2), $\theta_B = K_B * (X_B - X_{B0})$, $$\theta_B = \frac{0.005}{5000} * 360 * (20250000 - 20000000) = 90°.$$

In one embodiment of the present invention, when the driver 130 is changed into another driver, the first zero point positional value of the controller 150 is transferred to another driver for recovering the lost $X_{A0}$ of the driver 130.

For example, the zero point position recovering manner herein can be:

step 1: Maintenance workers enter the engine room;

step 2: The computer with the upper computer software as shown in FIG. 2 is connected to the pitch drive system for the wind turbine 100;

step 3: The recovering zero point through the controller button 220 which is corresponding to the encoder A (first position detector 120) is pressed, meanwhile, the upper computer software will execute a command corresponding to the recovering zero point through the controller button 220 so as to transfer the zero point position $\hat{X}_{A0}$ of the encoder A (first position detector 120) which is stored in the controller 150 to the driver 130, and the value of the zero point position $\hat{X}_{A0}$ is given to $X_{A0}$. At this time, $X_{A0}=10000000$ is substituted in formula (1), and the actual blade angle $\theta_A$ can be calculated.

In another embodiment of the present invention, when the controller 150 is changed into another controller, the second zero point positional value which is backed up to the driver 130 is transferred to another controller for recovering the lost $X_{B0}$ of the controller 150.

For example, the zero point position recovering manner herein can be:

step 1: Maintenance workers enter the engine room;

step 2: The computer with the upper computer software as shown in FIG. 2 is connected to the pitch drive system for the wind turbine 100;

step 3: The recovering zero point through the driver button 250 which is corresponding to the encoder B (second position detector 140) is pressed, meanwhile, the upper computer software will execute a command corresponding to the recovering zero point through the driver button 250 so as to transfer the zero point position $\hat{X}_{B0}$ of the encoder B (second position detector 140) which is stored in the driver 130 to the controller 150, and the value of the zero point position $\hat{X}_{B0}$ is given to $X_{B0}$. At this time $X_{B0}=20000000$ is substituted in formula (2), and the actual blade angle $\theta_B$ can be calculated.

In another embodiment of the present invention, when the first position detector 120 is changed into another first position detector, the $X_{A0}$ stored in the driver 130 and the $\hat{X}_{A0}$ stored in the controller are not suitable. The second blade angle $\theta_B$ is calculated by the controller 150 according to the second zero point position $X_{B0}$, and the second blade angle $\theta_B$ is transferred to the driver 130. The driver 130 reads the position value and the second blade angle $\theta_B$ according to another first position detector for calculating the first zero point positional value.

In this embodiment of the present invention, the second blade angle is calculated by the controller 150 according to the following formula:

$$\theta_B = K_B * (X_B - X_{B0}) \quad (2)$$

where $\theta_B$ is the second blade angle, $K_B$ is the transmission coefficient from the blade to the second position detector, $X_B$ is the position value the second position detector reads, and $X_{B0}$ is the second zero point positional value.

In this embodiment of the present invention, the first zero point position is calculated by the driver 130 according to the following formula:

$$X_{A0} = X_A - \frac{\theta_B}{K_A} \quad (3)$$

where $X_{A0}$ is the first zero point positional value, $X_A$ is the position value another first position detector reads, $\theta_B$ is the second blade angle, and $K_A$ is the transmission coefficient from the blade to another first position detector.

For example, when the encoder A (first position detector 120) is changed into an encoder A', the blade angle which is calculated according to formula (1) is not suitable due to the $X_{A0}$ in the formula (1) being changed. However, the blade angle $\theta_B$ which is calculated according to the formula (2) is still an actual angle of the blade. Therefore, the zero point position recovering manner herein can be:

step 1: Maintenance workers enter the engine room;

step 2: The computer with the upper computer software as shown in FIG. 2 is connected to the pitch drive system for the wind turbine 100;

step 3: The recovering zero point through the encoder B button 230 which is corresponding to the encoder A (first position detector 120) is pressed, meanwhile, referring to FIG. 4, the upper computer software will execute a command corresponding to the recovering zero point through the encoder B button 230. The controller 150 transfers $\theta_B$ to the driver 130 as a path B shown in FIG. 4. Subsequently, $X_{A0}$ can be calculated by the driver 130 according to the position value the encoder A' reads and $\theta_B$.

A condition is assumed as below to demonstrate the calculated way of the zero point position, after the encoder A (first position detector 120) is changed:

The blade angle herein is assumed as 90° ($\theta_B=90°$), the position value the encoder A' reads is 12000000, the zero point position $X_{A0}$ of the encoder A' is in the form of formula (3) as below:

$$X_{A0} = X_A - \frac{\theta_B}{K_A} = 12000000 - \frac{90}{\frac{0.001}{5000}*360} = 10750000.$$

Subsequently, the $X_{A0}=10750000$ is substituted in the formula (1), and the encoder A' $\theta_A$ is:

$$\theta_A = \frac{0.001}{5000} * 360 * (12000000 - 10750000) = 90°.$$

As can be seen in the foregoing calculation manner, the $\theta_A$ is the same as an actual angle of the blade.

In still another embodiment of the present invention, when the second position detector 140 is changed into another second position detector, the $\hat{X}_{B0}$ stored by the driver 130 and the $X_{B0}$ stored by the controller are not suitable. The first blade angle $\theta_A$ is calculated by the driver 130 according to the first zero point position $X_{A0}$, and the first blade angle $\theta_A$ is transferred to the controller 150. The second zero point positional value is calculated by the controller 150 according to the position value another second position detector reads and first blade angle $\theta_A$.

For example, the first blade angle is calculated by the driver 130 according to the following formula:

$$\theta_A = K_A * (X_A - X_{A0}) \quad (1),$$

where $\theta_A$ is the first blade angle, $K_A$ is the transmission coefficient from the blade to the first position detector 120, $X_A$ is the position value the first position detector 120 reads, and $X_{A0}$ is the first zero point positional value.

For example, the second zero point position is calculated by the controller 150 according to the following formula:

$$X_{B0} = X_B - \frac{\theta_A}{K_B}, \quad (4)$$

where $X_{B0}$ is the second zero point positional value, $X_B$ is the position value another second position detector reads, $\theta_A$ is the first blade angle, and $K_B$ is the transmission coefficient from the blade to another second position detector.

Figure 4:
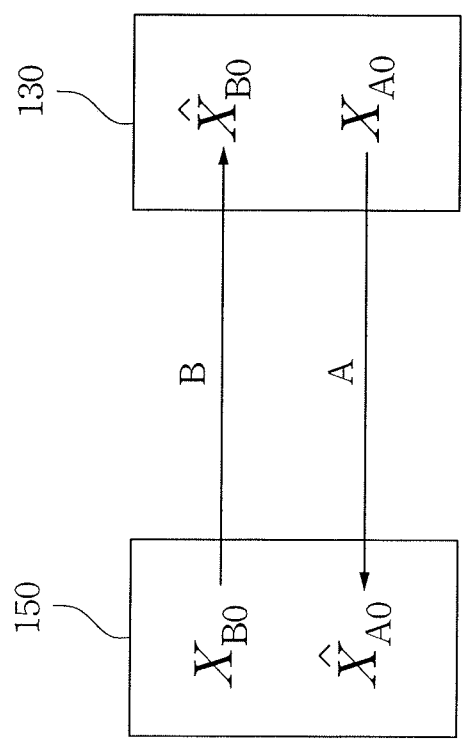
FIG. 4 schematically shows a diagram of a method for recovering an angel of a blade according to embodiments of the present invention.

For example, when the encoder B (second position detector 140) is changed into an encoder B', the blade angle calculated according to the formula (2) is not suitable due to the $X_{B0}$ in the formula (2) being changed. However, the blade angle $\theta_A$ calculated according to the formula (1) is still an actual angle of the blade. Therefore, the zero point position recovering manner herein can be:

step 1: Maintenance workers enter the engine room;

step 2: The computer with the upper computer software as shown in FIG. 2 is connected to the pitch drive system for the wind turbine 100;

step 3: the recovering zero point through the encoder A button 260 corresponding to the encoder B (second position detector 140) is pressed, meanwhile, referring to FIG. 4, the upper computer software will execute a command corresponding to the recovering zero point through the encoder A button 260. The driver 130 transfers $\theta_A$ to the controller 150 as a path A shown in FIG. 4. Subsequently, the $X_{B0}$ is calculated by the controller 150 according to the position value the encoder B' reads and $\theta_A$.

A condition is assumed as below to demonstrate the calculated way of the zero point position, after the encoder B (first position detector 140) is changed:

The blade angle herein is assumed as 90° ($\theta_A = 90°$) the position value the encoder B' reads is 22000000, the zero point position $X_{B0}$ of the encoder B' is in the form of formula (4) as below:

$$X_{B0} = X_B - \frac{\theta_A}{K_B} = 22000000 - \frac{90}{\frac{0.005}{5000} * 360} = 21750000.$$

Subsequently, the $X_{B0} = 21750000$ is substituted in formula (2), and the $\theta_B$ of the encoder B' is:

$$\theta_B = \frac{0.005}{5000} * 360 * (22000000 - 21750000) = 90°.$$

As can be seen in the foregoing calculation manner, the $\theta_B$ is the same as an actual angle of the blade.

Figure 5:
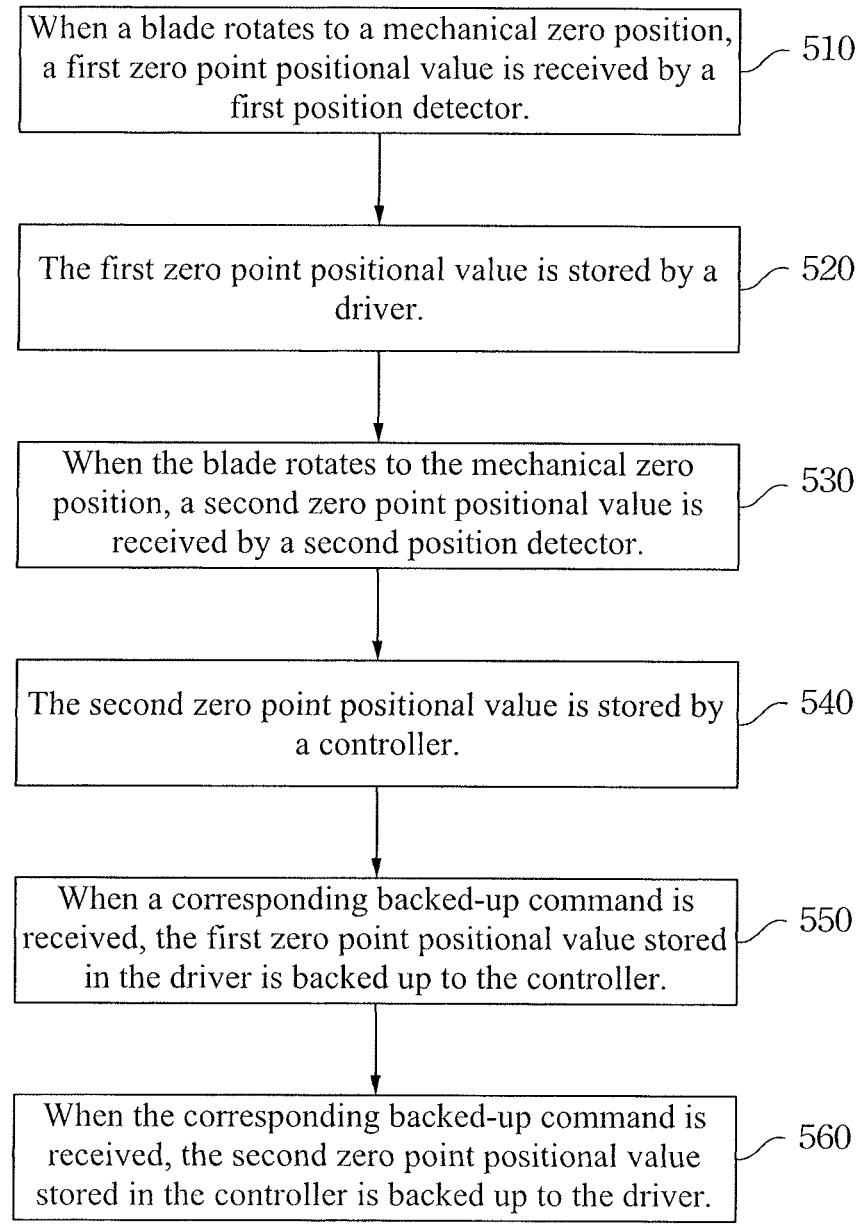
FIG. 5 schematically shows a flow diagram of a method for backing up and recovering blade zero point of pitch drive system for wind turbine according to embodiments of the present invention.

FIG. 5 schematically shows a flow diagram of a method for backing up and recovering a blade zero point of a pitch drive system for a wind turbine according to embodiments of the present invention. As shown in FIG. 5, a method for backing up and recovering the blade zero point of the pitch drive system for the wind turbine 500 comprises the steps of: when a blade rotates to a mechanical zero position, a first zero point positional value is received by a first position detector (step 510). The first zero point positional value is stored by a driver (step 520). When the blade rotates to the mechanical zero position, a second zero point positional value is received by a second position detector (step 530). The second zero point positional value is stored by a controller (step 540). When a corresponding backed-up command is received, the first zero point positional value stored in the driver is backed up to the controller (step 550). When the corresponding backed-up command is received, the second zero point positional value stored in the controller is backed up to the driver (step 560).

Reference is now made to both FIG. 1 and FIG. 5. In step 510, when the blade rotates to the mechanical zero position, the first zero point positional value can be received by the first position detector 120. In step 520, the first zero point positional value is stored by the driver 130. Referring to step 530, when the blade rotates to the mechanical zero position, the second zero point positional value can be received by the second position detector 140. In step 540, the second zero point positional value is stored by the controller 150.

In addition, referring to step 550, when the corresponding back-up command is received, the first zero point positional value stored in the driver 130 is backed up to the controller 150 through the communication bus 160. In step 560, when the corresponding back-up command is received, the second zero point positional value stored in the controller 150 is backed up to the driver 130 through the communication bus 160.

As mentioned above, when the driver is damaged and needed to be changed, the zero point position value can be transferred to a new driver through the communication bus due to the zero point position value which the driver needs being backed up to the controller in advance such that the zero point position value which the new driver needs can be recovered. In addition, when the controller is damaged and needed to be changed, the zero point position value can be transferred to a new controller through the communication bus due to the zero point position value which the controller needs being backed up to the driver in advance such that the zero point position value which the new controller needs can be recovered.

Consequently, with the use of the method for backing up and recovering a blade zero point of the pitch drive system for the wind turbine of the embodiment of the present invention, the zero position of the blade can be recovered directly when the elements of the pitch drive system is changed. The embodiment of the present invention provides the pitch drive system for a wind turbine which is simply to operate and is not time consuming. Furthermore, when the elements of the pitch drive system for a wind turbine of the embodiment of the present invention needs to be changed, it does not need many professionals to change the elements thereof so as to improve many problems when there being elements thereof needed to be changed.

In one embodiment of the present invention, when the driver 130 is changed into another driver, the first zero point positional value of the controller 150 is transferred to another driver for recovering the lost $X_{A0}$ of the driver 130.

For example, the zero point position recovering manner herein can be:

step 1: Maintenance workers enter the engine room;

step 2: The computer with the upper computer software as shown in FIG. 2 is connected to the communication bus 160 of the pitch drive system for the wind turbine 100;

step 3: The recovering zero point through the controller button 220 which is corresponding to the encoder A (first position detector 120) is pressed, meanwhile, the upper computer software will execute a command corresponding to the recovering zero point through the controller button 220 so as to transfer the zero point position $\hat{X}_{A0}$ of the encoder A (first position detector 120) which is stored in the controller 150 to the driver 130, and the value of the zero point position $\hat{X}_{A0}$ is given to $X_{A0}$. At this time, $X_{A0} = 10000000$ is substituted in formula (1), and the actual blade angle $\theta_A$ can be calculated.

In another embodiment of the present invention, when the controller 150 is changed into another controller, the second zero point positional value which is backed up to the driver 130 is transferred to another controller for recovering the lost $X_{B0}$ of the controller 150.

For example, the zero point position recovering manner herein can be:

step 1: Maintenance workers enter the engine room;

step 2: The computer with the upper computer software as shown in FIG. 2 is connected to the communication bus 160 of the pitch drive system for a wind turbine 100;

step 3: The recovering zero point through the driver button 250 which is corresponding to the encoder B (second position detector 140) is pressed, meanwhile, the upper computer software will execute a command corresponding to the recovering zero point through the driver button 250 so as to transfer the zero point position $\hat{X}_{B0}$ of the encoder B (second position detector 140) which is stored in the driver 130 to the controller 150, and the value of the zero point position $\hat{X}_{B0}$ is given to $X_{B0}$. At this time, $X_{B0}$=20000000 is substituted in formula (2), and the actual blade angle $\theta_B$ can be calculated.

In another embodiment of the present invention, when the first position detector 120 is changed into another first position detector, the $X_{A0}$ stored in the driver 130 and the $\hat{X}_{A0}$ the controller stored are not suitable. The second blade angle $\theta_B$ is calculated by the controller 150 according to the second zero point position $X_{B0}$, and the second blade angle $\theta_B$ is transferred to the driver 130. The driver 130 reads the position value and the second blade angle $\theta_B$ according to another first position detector for calculating the first zero point positional value.

In still another embodiment of the present invention, the second blade angle is calculated by the controller 150 according to the following formula:

$$\theta_B = K_B^*(X_B - X_{B0}),$$

where $\theta_B$ is the second blade angle, $K_B$ is the transmission coefficient from blade to second position detector, $X_B$ is the position value the second position detector reads, and $X_{B0}$ is the second zero point positional value.

In addition, the first zero point position is calculated by the driver 130 according to the following formula:

$$X_{A0} = X_A - \frac{\theta_B}{K_A},$$

where $X_{A0}$ is the first zero point positional value, $X_A$ is the position value another first position detector reads, $\theta_B$ is the second blade angle, and $K_A$ is the transmission is coefficient from the blade to another first position detector.

For example, when the encoder A (first position detector 120) is changed into a encoder A', the blade angle which is calculated according to formula (1) is not suitable due to the $X_{A0}$ in the formula (1) being changed. However, the blade angle $\theta_B$ which is calculated according to the formula (2) is still an actual angle of the blade. Therefore, the zero point position recovering manner herein can be:

step 1: Maintenance workers enter the engine room;

step 2: The computer with the upper computer software as shown in FIG. 2 is connected to the communication bus 160 of the pitch drive system for the wind turbine 100;

step 3: The recovering zero point through the encoder B button 230 which is corresponding to the encoder A (first position detector 120) is pressed, meanwhile, referring to FIG. 4, the upper computer software will execute a command corresponding to the recovering zero point through the encoder B button 230. The controller 150 transfers $\theta_B$ to the driver 130 as path B shown in FIG. 4. Subsequently, $X_{A0}$ can be calculated by the driver 130 according to the position value the encoder A' reads and $\theta_B$. The calculation manner is as mentioned above, and therefore, a detail description regarding the calculation manner is omitted herein for the sake of brevity.

In one embodiment of the present invention, when the second position detector 140 is changed into another second position detector, the $\hat{X}_{B0}$ stored by the driver 130 and the $X_{B0}$ stored by the controller are not suitable. The first blade angle $\theta_A$ is calculated by the driver 130 according to the first zero point position $X_{A0}$, and the first blade angle $\theta_A$ is transferred to the controller 150. The second zero point positional value is calculated by the controller 150 according to the position value another second position detector reads and first blade angle $\theta_A$.

In another embodiment of the present invention, the first blade angle is calculated by the driver 130 according to the following formula:

$$\theta_A = K_A^*(X_A - X_{A0}),$$

where $\theta_A$ is the first blade angle, $K_A$ is the transmission coefficient from the blade to the first position detector 120, $X_A$ is the position value the first position detector 120 reads, and $X_{A0}$ is the first zero point positional value.

In still another embodiment of the present invention, the second zero point position is calculated by the controller 150 according to the following formula:

$$X_{B0} = X_B - \frac{\theta_A}{K_B}, \qquad (4)$$

where $X_{B0}$ is the second zero point positional value, $X_B$ is the position value another second position detector reads, $\theta_A$ is the first blade angle, and $K_B$ is the transmission coefficient from the blade to another second position detector.

For example, when the encoder B (second position detector 140) is changed into encoder B', the blade angle calculated according to the formula (2) is not suitable due to the $X_{B0}$ in the formula (2) being changed. However, the blade angle $\theta_A$ calculated according to the formula (1) is still an actual angle of the blade. Therefore, the zero point position recovering manner herein can be:

step 1: Maintenance workers enter the engine room;

step 2: The computer with the upper computer software as shown in FIG. 2 is connected to the communication bus 160 of the pitch drive system for the wind turbine 100;

step 3: the recovering zero point through the encoder A button 260 corresponding to the encoder B (second position detector 140) is pressed, meanwhile, referring to FIG. 4, the upper computer software will execute a command corresponding to the recovering zero point through the encoder A button 260. The driver 130 transfers $\theta_A$ to controller 150 as a path A shown in FIG. 4. Subsequently, the $X_{B0}$ is calculated by the controller 150 according to the position value the encoder B' reads and $\theta_A$. The calculation manner is as mentioned above, and therefore, a detail description regarding the calculation manner is omitted herein for the sake of brevity.

Those having skill in the art will appreciate that the method for backing up and recovering the blade zero point of the pitch drive system for the wind turbine can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementations will typically employ optically oriented hardware, software, and or firmware.

In addition, those skilled in the art will appreciate that each of the steps of the method for backing up and recovering the blade zero point of the pitch drive system for the wind turbine named after the function thereof is merely used to describe the technology in the embodiment of the present invention in detail but not limited to. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides a pitch drive system for a wind turbine and a method for backing up and recovering a blade zero point of the pitch drive system for the wind turbine, which address the problem of changing elements in the pitch drive system for the wind turbine being merely executed by many professionals such that it is not only complex, but also time consuming.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A method for backing up and recovering a blade zero point of a pitch drive system for a wind turbine, comprising:
   when a blade rotates to a mechanical zero position, generating a first zero point positional value with a first position detector;
   the first zero point positional value being stored by a driver;
   when the blade rotates to the mechanical zero position, generating a second zero point positional value with a second position detector;
   the second zero point positional value being stored by a controller;
   when a corresponding back-up command is received, the first zero point positional value stored in the driver is backed up to the controller; and
   when the corresponding back-up command is received, the second zero point positional value stored in the controller is backed up to the driver.

2. The method according to claim 1, wherein when the driver is replaced with a different driver, the first zero point positional value which is backed up in the controller is transferred to the different driver.

3. The method according to claim 1, wherein when the controller is replaced with a different controller, the second zero point positional value which is backed up in the driver is transferred to the different controller.

4. The method according to claim 1, wherein when the first position detector is replaced with a different first position detector, a blade angle is calculated by the controller according to the second zero point position, and the blade angle is transferred to the driver, wherein the first zero point positional value is recalculated by the driver according to a position value detected by the different first position detector and the blade angle.

5. The method according to claim 4, wherein the blade angle is calculated by the controller according to the following formula:

$$\theta_B = K_B * (X_B - X_{B0}),$$

wherein $\theta_B$ is the blade angle, $K_B$ is a transmission coefficient from the blade to the second position detector, $X_B$ is a position value the second position detector reads, and $X_{B0}$ is the second zero point positional value.

6. The method according to claim 4, wherein the first zero point position is recalculated by the driver according to the following formula:

$$X_{A0} = X_A - \frac{\theta_B}{K_A},$$

wherein $X_{A0}$ is the first zero point positional value, $X_A$ is a position value the different first position detector reads, $\theta_B$ is the second blade angle, and $K_A$ is a transmission coefficient from the blade to the different first position detector.

7. The method according to claim 1, wherein when the second position detector is replaced with a different second position detector, a first blade angle is calculated by the driver according to the first zero point position, and the first blade angle is transferred to the controller, wherein the second zero point positional value is recalculated by the controller according to a position value detected by the different second position detector and the first blade angle.

8. The method according to claim 7, wherein the first blade angle is calculated by the controller according to the following formula:

$$\theta_A = K_A * (X_A - X_{A0}),$$

wherein $\theta_A$ is the first blade angle, $K_A$ is a transmission coefficient from the blade to the first position detector, $X_A$ is a position value the first position detector reads, and $X_{A0}$ is the first zero point positional value.

9. The method according to claim 7, wherein the second zero point position is recalculated by the controller according to the following formula:

$$X_{B0} = X_B - \frac{\theta_A}{K_B},$$

wherein $X_{B0}$ is the second zero point positional value, $X_B$ is a position value the different second position detector reads, $\theta_A$ is the first blade angle, and $K_B$ is a transmission coefficient from the blade to the different second position detector.

* * * * *